(12) United States Patent
Goodman

(10) Patent No.: US 7,145,990 B2
(45) Date of Patent: Dec. 5, 2006

(54) HIGH-SPEED DATA COMMUNICATION OVER A RESIDENTIAL TELEPHONE WIRING NETWORK

(75) Inventor: David D. Goodman, Arlington, VA (US)

(73) Assignee: Inline Connection Corporation, Chevy Chase, MD (US)

( * ) Notice: Subject to any disclaimer, the term of this patent is extended or adjusted under 35 U.S.C. 154(b) by 233 days.

(21) Appl. No.: 10/383,684

(22) Filed: Mar. 10, 2003

(65) Prior Publication Data

US 2003/0147513 A1 Aug. 7, 2003

Related U.S. Application Data

(63) Continuation of application No. 09/591,199, filed on Jun. 9, 2000, now Pat. No. 6,532,279.
(60) Provisional application No. 60/138,754, filed on Jun. 11, 1999.

(51) Int. Cl.
*H04M 11/00* (2006.01)

(52) U.S. Cl. .................. 379/90.01; 379/93.08
(58) Field of Classification Search .............. 379/90.01, 379/93.08, 93.05, 93.06, 93.07, 93.09, 93.14, 379/93.28, 93.31; 370/352, 486, 487, 488, 370/490
See application file for complete search history.

(56) References Cited

U.S. PATENT DOCUMENTS

| | | |
|---|---|---|
| 2,568,342 A | 9/1951 | Koehler et al. |
| 3,406,344 A | 10/1968 | Hopper et al. |
| 3,511,936 A | 5/1970 | Saltzberg |
| 3,512,160 A | 5/1970 | Meeker |
| 3,529,088 A | 9/1970 | Hauer |
| 3,651,471 A | 3/1972 | Haselwood et al. |
| 3,699,443 A | 10/1972 | Weger |
| 3,723,653 A | 3/1973 | Tatsuzawa |
| 3,757,225 A | 9/1973 | Ulicki |
| 3,774,114 A | 11/1973 | Dahlgren |

(Continued)

FOREIGN PATENT DOCUMENTS

| | | |
|---|---|---|
| EP | 0 062 442 | 10/1982 |
| GB | 2-166322 | 4/1986 |
| GB | 2-166328 | 4/1986 |
| JP | 1-27358 | 1/1989 |
| WO | WO 88/05979 | 8/1988 |

(Continued)

OTHER PUBLICATIONS

O. Agazzi, et al., "Large–Scale Integration of Hybrid–Method Digital Subscriber Loops," IEEE Transactions on Communications, vol. COM–30, No. 9, Sep. 1982, pp. 2095–2108.

(Continued)

*Primary Examiner*—Stella Woo
(74) *Attorney, Agent, or Firm*—Hansen Huang Tech Law Group LLP

(57) ABSTRACT

A method and system for communicating between a number of computers within a residence over an active telephone network, and for communicating data between a telephone exchange and the residence in a first data band concurrently with the computers communicating in a second data band over the telephone wiring network within the residence. A modem bridges communication in the first data band and the second data band enabling the computers to communicate with the telephone exchange, which may provide a data path to other computers, for instance over the Internet. In addition, signals such as video signals can be distributed within the residence in an additional high-frequency band making use of common circuitry for both data and video communication.

8 Claims, 7 Drawing Sheets

U.S. PATENT DOCUMENTS

| | | |
|---|---|---|
| 3,800,090 A | 3/1974 | Matena |
| 3,838,444 A | 9/1974 | Loughlin et al. |
| 3,872,253 A | 3/1975 | Jurschak |
| 3,873,771 A | 3/1975 | Kleineman et al. |
| 3,894,190 A | 7/1975 | Gassmann |
| 3,911,204 A | 10/1975 | Spinelli |
| 3,922,490 A | 11/1975 | Pettis |
| 3,922,492 A | 11/1975 | Lumsden |
| 3,937,889 A | 2/1976 | Bell, III et al. |
| 3,968,327 A | 7/1976 | Gregg, III |
| 3,974,337 A | 8/1976 | Tatsuzawa |
| 3,992,589 A | 11/1976 | Kuegler |
| 4,008,369 A | 2/1977 | Theurer et al. |
| 4,019,142 A | 4/1977 | Wycoff |
| 4,025,851 A | 5/1977 | Haselwood et al. |
| 4,035,838 A | 7/1977 | Bassani et al. |
| 4,040,088 A | 8/1977 | Hannan |
| 4,054,910 A | 10/1977 | Chou et al. |
| 4,055,729 A | 10/1977 | Vandling |
| 4,122,304 A | 10/1978 | Mallien, II |
| 4,123,710 A | 10/1978 | Stuart et al. |
| 4,130,840 A | 12/1978 | Vandling |
| 4,163,254 A | 7/1979 | Block et al. |
| 4,171,467 A | 10/1979 | Evenchik |
| 4,197,497 A | 4/1980 | Phelps |
| 4,206,320 A | 6/1980 | Keasler et al. |
| 4,238,849 A | 12/1980 | Gassmann |
| 4,302,629 A | 11/1981 | Foulkes et al. |
| 4,306,116 A | 12/1981 | McClure et al. |
| 4,328,579 A | 5/1982 | Hashimoto et al. |
| 4,332,980 A | 6/1982 | Reynolds et al. |
| 4,337,376 A | 6/1982 | Gruenberg |
| 4,338,492 A | 7/1982 | Snopko |
| 4,349,701 A | 9/1982 | Snopko |
| 4,354,263 A | 10/1982 | Bordry et al. |
| 4,356,509 A | 10/1982 | Skerlos et al. |
| 4,367,557 A | 1/1983 | Stern et al. |
| 4,378,470 A | 3/1983 | Murto et al. |
| 4,388,489 A | 6/1983 | Wigan et al. |
| 4,393,277 A | 7/1983 | Besen et al. |
| 4,393,508 A | 7/1983 | Boudault |
| 4,396,801 A | 8/1983 | Edson et al. |
| 4,411,007 A | 10/1983 | Rodman et al. |
| 4,418,249 A | 11/1983 | Birth |
| 4,425,578 A | 1/1984 | Hasselwood et al. |
| 4,425,642 A | 1/1984 | Moses et al. |
| 4,427,974 A | 1/1984 | Sheahan |
| 4,433,212 A | 2/1984 | Moses et al. |
| 4,441,180 A | 4/1984 | Schussler |
| 4,442,320 A | 4/1984 | James et al. |
| 4,443,662 A | 4/1984 | Nakhla |
| 4,445,213 A | 4/1984 | Baugh et al. |
| 4,446,458 A | 5/1984 | Cook |
| 4,449,218 A | 5/1984 | Strehl |
| 4,456,925 A | 6/1984 | Skerlos et al. |
| 4,456,985 A | 6/1984 | Carsten et al. |
| 4,456,986 A | 6/1984 | Carsten et al. |
| 4,467,355 A | 8/1984 | Matsuda |
| 4,484,218 A | 11/1984 | Boland et al. |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,509,211 A | 4/1985 | Robbins |
| 4,521,881 A | 6/1985 | Stapleford et al. |
| 4,528,422 A | 7/1985 | Cupani |
| 4,528,423 A | 7/1985 | James et al. |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | ab der Halden |
| 4,597,077 A | 6/1986 | Nelson et al. |
| 4,604,741 A | 8/1986 | Barsellotti |
| 4,608,686 A | 8/1986 | Barsellotti |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,665,516 A | 5/1987 | Middleton et al. |
| 4,670,870 A | 6/1987 | Hewinson |
| 4,670,874 A | 6/1987 | Sato et al. |
| 4,672,602 A | 6/1987 | Hargrave et al. |
| 4,672,605 A | 6/1987 | Hustig et al. |
| 4,675,863 A | 6/1987 | Paneth et al. |
| 4,679,227 A | 7/1987 | Hughes-Hartogs |
| 4,709,412 A | 11/1987 | Seymour et al. |
| 4,731,816 A | 3/1988 | Hughes-Hartogs |
| 4,754,326 A | 6/1988 | Kram et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,817,089 A | 3/1989 | Paneth et al. |
| 4,825,435 A | 4/1989 | Amundsen |
| 4,829,570 A | 5/1989 | Schotz |
| 4,833,706 A | 5/1989 | Hughes-Hartogs |
| 4,837,799 A | 6/1989 | Prohs et al. |
| 4,839,743 A | 6/1989 | Best et al. |
| 4,849,811 A | 7/1989 | Kleinerman |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,907,260 A | 3/1990 | Prohs et al. |
| 4,912,705 A | 3/1990 | Paneth et al. |
| 4,918,688 A | 4/1990 | Krause et al. |
| 4,924,492 A | 5/1990 | Gitlin et al. |
| 4,932,022 A | 6/1990 | Keeney et al. |
| 4,932,047 A | 6/1990 | Emmons et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlin et al. |
| 4,975,896 A | 12/1990 | D'Agosto, III, et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |

| | | | |
|---|---|---|---|
| 5,003,579 | A | 3/1991 | Jones |
| 5,010,399 | A | 4/1991 | Goodman et al. |
| 5,025,443 | A | 6/1991 | Gupta |
| 5,036,513 | A | 7/1991 | Greenblatt |
| 5,051,822 | A | 9/1991 | Rhoades |
| 5,089,886 | A | 2/1992 | Grandmougin |
| 5,095,497 | A | 3/1992 | Aman |
| 5,247,347 | A | 9/1993 | Litteral |
| 5,283,637 | A | 2/1994 | Goolcharan |
| 5,929,896 | A | 7/1999 | Goodman |
| 5,930,340 | A * | 7/1999 | Bell .................. 379/90.01 |
| 5,949,476 | A | 9/1999 | Pocock et al. |
| 6,069,899 | A * | 5/2000 | Foley ................ 379/90.01 |
| 6,115,755 | A * | 9/2000 | Krishan ............... 370/352 |
| 6,185,284 | B1 | 2/2001 | Goodman |
| 6,430,199 | B1 * | 8/2002 | Kerpez ............... 379/90.01 |
| 6,532,279 | B1 | 3/2003 | Goodman |
| 6,678,721 | B1 * | 1/2004 | Bell .................... 709/209 |
| 2003/0016794 | A1 * | 1/2003 | Brothers ............ 379/90.01 |

FOREIGN PATENT DOCUMENTS

| | | |
|---|---|---|
| WO | WO9107018 | 5/1991 |
| WO | WO 98/54856 | 12/1998 |
| WO | WO 99/12330 | 3/1999 |

OTHER PUBLICATIONS

S. V. Ahamed, et al., "A Tutorial on Two–Wire Digital Transmission in the Loop Plant," IEEE Transaction on Communications, Nov. 1981, pp. 1554–1564, vol. COM–29, No. 11.

J. Alves, "Data Over Voice—A Low Cost LAN Alternative," Communications Show and Conference, MECOM 87, Jan. 13–15.

S. B. Andrews, "The Generic Digital Channel Concept," IEEE International Conference on Communications, 1985, Jun. 23–26, 1985, Chicago, IL, pp. 7.1.1–7.1.3.

E. Arnon, et al., "Customer Access System Design," IEEE International Conference on Communications, Sep. 1982, vol. COM–30, No. 9, pp. 2143–2149.

A. Artom, et al., "The Possible Use of Customer Loop For New Services During The Transition From Analogue To Digital," Revue F.I.T.C.E., Mar.–Apr. 1981, vol. 20, No. 2, p. 50–56.

A. Artom, et al., "The Possible Use of Customer Loop for New Services During the Transition from Analogue to Digital," CSELT Rapporti Tecnici, vol. VIII, No. 4, Dec. 1980, pp. 215–220.

A. Artom, et al., "Medium–Term Prospects for New Services to the Telephone Customers," CSELT Rapporti Tecnici, vol. IX, Supplemento Al No. 4, Aug. 1981, pp. 345–351.

A. ARtom, et al., "Medium–Term Prospects for New Services to the Telephone Customers," Conference Record, Jun. 14–18, 1981, Int'l Conf. On Communications, pp. 14.4.1–14.4–6, Denver, CO.

G.W. Beene, "Design Considerations for A CO–Powered Distributed–Drop PCM Station Carrier," IEEE Transactions on Communications, vol. COM–30, No. 9, Sep. 1982, pp. 2022–2028.

L. Bella, et al., "A Medium Term Network Architecture for New Services: Problems and Experimental Results," CSELT Rapporti Tecnici, vol. 10, No. 1, Feb. 1982, pp. 25–29.

A. Bienz, "1+1=1—Oder das Telefonnetz als Datennetz" Sysdata, vol. 16, No., Aug. 28, 1985, pp. 41–42.

A. Brosio, et al., "A Comparison of Digital Subscriber Line Transmission Systems Employing Different Line Codes," IEEE Transactions on Communications, vol. COM–29, No. 11, Nov. 1981, pp. 1581–1588.

T.P. Byrne, et al., "Positioning the Subscriber Loop Network for Digital Services," IEEE Transactions on Communications, vol. COM–30, No. 9, Sep. 1982, pp. 2006–2011.

R. G. Cornell, et al., "Progress Towards Digital Subscriber Line Services and Signaling," IEEE Transactions on Communications, vol. COM–29, No. 11, Nov. 981, pp. 1589–1594.

S. Davis, "Integrating Voice and Data: A Marriage of Convenience," Today's Office, vol. 24, No. 9, Feb. 1990, pp. 28, 30.

M. Decina, "Progress Towards User Access Arrangements in Integrated Services Digital Networks," IEEE Transactions on Communications, vol. COM–30, No. 9, Sep. 1982, pp. 2117–2130.

M. Devault, et al., "Resaux Domestiques et Terminaux Audiovisuels Numeriques," L'Echo des Recherches, No. 126, 1986, pp. 37–46.

H. Fuchs, et al., "Providing Full Duplex Transmission Over Two–wire Subscriber Loops," Telephony, Mar. 18, 1985, pp. 76–84, vol. 208, No. 11.

H. Fukagawa, et al., "Bus Wiring System for Residences," Matsushita Electric Works Technical Report, No. 36, Feb. 1988, pp. 31–35.

D. Glick, et al., "Providing Telco Customers Continuous Data Services," Telephony, Nov. 21, 1983, vol. 205, No. 22, p. 46, 50–54.

J. M. Griffiths, "ISDN Network Terminating Equipment," IEEE Transactions on Communications, vol. COM–30, No. 9, Sep. 1982, pp. 2137–2142.

Hoe–Young Noh, "Home Automation," Korea Information Science Society Review, Apr. 1989, vol. 7, No. 2, pp. 40–44, Republic of Korea. (Translation Provided).

M. Hofferber, "The Desktop Options for Integrating Voice and Data," The Office, vol. 107, No. 2, Feb. 1988, pp. 71–73.

J. B. Hughes, et al. "A Receiver IC for a 1+1 Digital Subscriber Loop," IEEE Journal of Solid–State Circuits, Jun. 1985 (pp. 671–678), vol. SC–20, No. 3.

M. Inoue, et al., "The MELON Home Automation Housekeeping System," Mitsubishi Denki Giho, vol. 63, No. 2, 1989, pp. 36–41.

M. Ise, et al., "Sharp Home Bus System," Sharp Technical Journal, No. 29, 1984, pp. 49–55.

R. Jelski, "Subscriber Subcarrier System—A New Life," Communications International, vol. 4, No. 5, May 1977, pp. 29–30.

A. J. Karia, et al., "A Digital Subscriber Carrier System for the Evolving Subscriber Loop Network," IEEE Transactions on Communications, vol. COM–30, No. 9, Sep. 1982, pp. 2012, 2014, 2015.

J. W. Lechleider, "Loop Transmission Aspect of ISDN Basic Access," IEEE Journal on Selected Areas in Communications, vol. SAC–4, No. 8, Nov. 1986, pp. 1294–1301.

H. S. Liu, et al., "A Working Research Prototype of an ISDN Central Office," IEEE Journal on Selected Areas in Communications, vol. SAC–4, No. 8, Nov. 1986, pp. 1241–1250.

T. Masuda, et al., "2–Wire Video Intercom System with Telephone," National Technical Report, vol. 37, No. 6, Dec. 1991, pp. 74–80.

T. Matthews, "Telecomm System is Nerve Center," Infosystems, vol. 31, No. 5, May 1984, pp. 68–69.

J. C. McDonald, "A Proactive ISDN Implementation Strategy," IEEE Journal on Selected Areas in Communications, vol. SAC–4, No. 8, Nov. 1986, pp. 1218–1221.

F. Melindo, et al., "Network and System Architecture: The Integrated Approach to ISDN in the UT Line," IEEE Journal on Selected Areas in Communications, vol. SAC–4, No. 8, Nov. 1986, pp. 1251–1256.

J. K. Merrow, "A New Approach to Integrating Local Area Data and Voice Transmission," Telephony, vol. 250, No. 17, Oct. 1983, 2 pages.

H. Morgan, "Two–Wire Full–Duplex Modem Simplifies Voice and Data Networking," Mini–Micro Systems, vol. 17, No. 3, Mar. 1984, 4 pages.

R. Murakoshi., "Home Automation," Journal of the Society of Instrument and Control Engineers, vol. 23, No. 11, Nov. 1984, pp. 955–958.

R.D. Nash, et al., "Simultaneous Transmissions of Speech and Data Over an Analog Telephone Channel," GLOBECOM '85. IEEE Global Telecommunications Conference. Conference Record. Communication Technology to Provide New Services, Dec. 25, 1985, New Orleans, Louisana, pp. 4.2.1–4.2.4.

H. Ogiwara, et al., Design Philosophy and Hardware Implementation for Digital Subscriber Loops, IEEE Transactions on Communications, vol. COM–30, No. 9, Sep. 1982, pp. 2057–2065.

J. L. Pemin, "Related Evolution of Subscriber Loop Plant and Residential Data Transmission Needs," Intelcon 79 Exposition Proceedings, Feb. 26–Mar. 2, 1979, Dallas, Texas, pp. 596–599.

Z. Shachman, "Data Over Voice In Action," Communications, vol. 3, No. 12, p. 30, Dec. 1986.

H. Shimizu, et al., "An Integrated Voice/Data Terminal with Simple Synchronization Circuits Using an 80 kbit/s Ping–Pong Method," IEEE Transactions on Communications, vol. COM–30, No. 9, Sep. 1982, pp. 2109–2116.

T. Soejima, et al., "Experimental Bidirectional Subscriber Loop Transmission System," IEEE Transactions on Communications, vol. COM–30, No. 9, Sep. 1982, pp. 2066–2073.

R.A. Tatum, "Project–Victoria—the 7–in–1 solution," Telephone Engr. And Mgmt, Jan. 1, 1986, vol. 90, No. 1, pp. 47–51, Jan. 1, 1996.

A. Teshima, et al., "Still Video Telecommunication Over the Analog Telephone Network," Journal of the Institute of Television Engineers of Japan, vol. 42, No. 11, Nov. 1988, pp. 1162–1167.

S.R. Treves, et al., "Text, Image and Data Integration in a Distributed Control Digital Voice Switching System," International Switching Symposium—ISS '81 CIC, Sep. 21–25, 1981, Montreal, Quebec, Canada, pp. 1–7.

T. Tsuda, et al., "Experimental In–House Multiservice Communication System," Fujitsu Scientific and Technical Journal, vol. 16, No. 3, Sep. 1980, pp. 29–45.

S. Tsuruta, "Home Media Bus: An Integrated Network for Home Information Systems," 1984 IEEE International Conference on Consumer Electronics. Digest of Technical Papers, Jun. 6–8, 1984, Rosemont, Illinois, 2 pp.

K. Urui, "Integrated Voice/Data Digital EPBX," Toshiba Review, No. 150, winter 1984, pp. 30–33.

R. A. Valenzuela, "The Design of a Full Duplex 88 KBPS Echo–Cancelling Data Over Voice System for the Subscriber Loop," Digital Signal Process—84. Proceedings of the International Conference, Sep. 5–8, 1984, Florence, Italy, pp. 565–569.

A. F. van den Berg, et al., "Principes van de Modem: Technieken en Specificaties," Elektronica, vol. 32, No. 5, Mar. 9, 1984, pp. 11, 13, 15, 17, 19 and 21.

M. G. Vry, et al., "Digital 1+1 Systems for Local Network enhancement," Conference on Communications Equipment and Systems, Apr. 20–22, 1982, Birmingham, United Kingdom, pp. 61–64.

M. G. Vry, et al., "The Design of a 1+1 System for Digital Signal Transmission to the Subscriber," NTG–Bachberichte, vol. 73, 1980, pp. 36–40.

K. B. Waber, "Considerations on Customer Access to the ISDN," IEEE Transactions on Communications, vol. COM–30, No. 9, Sep. 1982, pp. 2131–2136.

J.A. Webb, "A New Concept in Data–Above–Voice (DAV)", PTC '86: Evolutions of the Digital Pacific. Telecommunications—Asia, Americas, Pacific: PTC'86 Proceedings, Jan. 12–15, 1986, Honolulu, Hawaii, pp. 260–265.

K. Yamamoto, "A Home Terminal System Using the Home Area Information Network," IEEE Transactions on Consumer Electronics, vol. CE–30, No. 4, Nov. 1984, pp. 608–616.

_, "Centrex LAN Can Provide Advanced Network Capabilities over the Existing Telephone Wires," Communications News, vol. 25, No. 6, Jun. 1988, p. 27.

_, "Data Over Voice is Solution for Corporate Network," Telephone Engineer and Management, vol. 91, No. 9, May 1, 1987, pp. 67–69.

_, "Data Carrrier System Allows Simultaneous Voice/Data Transmission for PABX Telephone Systems," Computer Design, vol. 21, No. 5, May 1982, pp. 68, 70.

_, "Computerized Telephone System Integrates Voice And Data Switching," Computer Design, Apr. 1981, (6 Pages), vol. 20, No. 4.

_, "AT&T's Systemax Premises Distribution System Solves Networking Problems," *Fiber Optics Magazine*, vol. 12, No. 4, Jul.–Aug. 1990, pp. 14–16.

Complaint for Injunctive Relief and Damages for Infringement of U.S. Patent Nos. 6,243,446; 6,236,718; and 5,844,596 (Apr. 12, 2002).

Answer and Counterclaims of Defendants AOL Time Warner Inc. and America Online, Inc. (Jun. 24, 2002).

America Online Inc.'s Response to Inline Connection Corp.'s First Set of Interrogatories (App. A, Ex. B, App. D) (Feb. 28, 2003).

Defendant America Online Inc.'s Responses to Plaintiff Inline Connection Corp.'s First Set of Requests for Admissions, Second Set of Interrogatories and Second Set of Requests for Production of Documents (Feb. 28, 2003).

America Online, Inc.'s Supplemental Responses to Inline Connection Corp.'s First Set of Interrogatories (Nos. 13, 14 and 20) (Apr. 28, 2003).

Second Amended Answer and Counterclaims of Defendants AOL Time Warner Inc. and America Online, Inc., (May 16, 2003).

America Online, Inc.'s Second Supplemental Responses to Inline Connection Corp.'s First Set of Interrogatories, Ex.'s A–D (Jun. 11, 2003).

Joint Submission Regarding Claim Construction (Ex. 3,App. A) (Jul. 15, 2003).

Inline's Opening *Markman* Brief (Aug. 4, 2003).

Defendants' Memorandum of Law on Claim Construction (Aug. 4, 2003).

Defendant's Motion for Summary Judgment of Non–Infringement Or in the Alternative, for Summary Judgment of Invalidity for Failure to Comply with the Written Description Requirement; Defendant' Joint Opening Brief in Support of Their Motion for Summary Judgment of Non–Infringement Or in the Alternative, for Summary Judgment of Invalidity for Failure to Comply with the Written Description Requirement (Aug. 8, 2003).

Inline's Responsive *Markman* Brief; Declaration of Charles L. Jackson in Support of Inline's Responsive *Markman* Brief (Aug. 21, 2003).

Inline's *Markman* Presentation; Tutorial by Dr. Charles Jackson.

AOL's & EarthLink's Technology Tutorial & *Markman* Presentation, (Aug. 28, 2003).

In the Matter of *Inline Connection Corporation v. AOL Time Warner, Incorporated* (Transcript of *Markman* hearing) (Aug. 28, 2003).

Letter to Judge Thynge from Frederick L. Cottrell III offering supplemental briefing and enclosing proposed claim construction (Sep. 8, 2003).

Letter to Judge Thynge from Donald F. Parsons responding to Sep. 8, 2003 Cottrell letter re supplemental briefing, enclosing proposed claim consruction, Waring article and decision in *E–Pass Technologies, Inc. v. 3Com Corp.* (Sep. 12, 2003).

Memorandum (Judge Thynge) (*Markman*), (Jan. 27, 2004).

Inline's Motion for Reargument And/Or Reconsideration of the Court's Construction of the Phrase "A High Frequency Band of Frequencies Above the Highest Frequency of the Telephone Voice Band" (Ex's A–C) (Feb. 10, 2004).

Defendants' Response to Inline's Motion for Reargument And/Or Reconsideration of the Court's Construction of the Phrase "A High Frequency Band of Frequencies Above the Highest Frequency of The Telephone Voice Band" (Mar. 2, 2004).

Defendants' Joint Revised Brief in Support of Their Motion for Summary Judgment of Non–Infringement and for Summary Judgment of Invalidity for Failure to Comply with the Written Description Requirement (Mar. 8, 2004).

Inline Connection Corp.'s Opposition to Defendants' Revised Motion for Summary Judgment (Apr. 6, 2004) Declaration of Dr. Charles L. Jackson, (Apr. 6, 2004).

Inline's Opening Brief in Support of its Motion for Partial Summary Judgment of Infringement by America Online and Earthlink on the Asserted Claims of the '596, '446, and '585 Patents (Attachments 1–3) (Apr. 19, 2004) Declaration of Infringement by Charles L. Jackson In Support of Inline's Opening Brief in Support of its Motion for Partial Summary Judgment America Online and Earthlink on the Asserted Claims of the '596, '446, and '585 Patents (Apr. 16, 2004).

Defendants' Reply Brief in Support of Their Revised Motion for Summary Judgment of Non–Infringement and for Summary Judgment of Invalidity for Failure to Comply with the Written Description Requirement (Apr. 26, 2004).

Defendants' Opposition to Inline's Motion for Partial Summary Judgment of Infringement (Ex.'s A, B) (May 20, 2004).

Inline's Reply to Defendants' Opposition to Inline's Motion for Partial Summary Judgment of Infringement by America Online and Earthlink of Asserted Claims of the '596, '446 and '585 Patents (Jun. 9, 2004).

Memorandum Opinion (Judge Thynge) (Oct. 14, 2004).

M. M. Anderson, "Video Services on Copper," Conference: ICC 91, International Conference on Communications Conference Record, Jun. 2–26, 1991, Denver, CO, pp. 302–306.

M. Bastian, "Voice–Data Integration: An Architecture Perspective," IEEE Communications Magazine, vol. 24, No. 7, Jul. 1986, pp. 8–12.

M. Boubekker, "Bandwidth Reduction for the Transmission of Sign Language Over Telephone Lines," Proceedings of the SPIE–The International Society for Optical Engineering, vol. 1001, Pt. 1, 1988, pp. 223–230.

S. Bramblett, "Connect Terminals to Your CPU Over PBX Telephone Lines," EDN, vol. 31, No. 5, Mar. 6, 1986, pp. 239–243, 245, 246, 248.

G. D. Carse, "New and Future Technologies in the Local Telephone Network: The Victoria System," Conference: IEEE International Conference on Communications '86, ICC '86; Integrating the World Through Communications Conference Record, Jun. 22–25, 1986, Toronto, Ontario, Canada, pp. 410–412.

M. Coronaro, et al., "Integrated Office Communication System," Electrical Communication, vol. 60, No. 1, 1986, pp. 17–22.

C. Douligeris, et al., "Communications and Control for a Home Automation System," Conference: IEEE Proceedings of the Southeastcon '91, vol. 1, pp. 171–175.

D.G.J. Fanshawe, "Architures for Home Systems," Conference: IEEE Colloquium on Home Systems—Information, Entertainment and Control, Oct. 1, 1990, London, United Kingdom, pp. 3/1–3/3.

D.G.J. Fanshawe, et al., "IHS Protocols Support New Features on the Home Network," Conference: IEEE 1989 International Conference on Consumer Electronics, Digest of Technical papers, ICCE, Jun. 6–9, 1989, Rosemont, IL, 1 p.

N.C. Hightower, "Integrated Voice, Data and Video in the Local Loop," IEEE 1986, pp. 915–919.

M. Inoue, et al., "A Home Automation System," IEEE Transactions on Consumer Electronics, vol. CE–31, No. 3, Aug. 1985, pp. 516–527.

J. W. Lechleider, "Study of the Feasibility and Advisability of Digital Subscriber Lines Operating at Rates Substantially in Excess of the Basic Access Rate," T1E1.4 Technical Subcommittee (T1 E 1.4/89–070), 1 p.

D. Mandrino, et al., "Equipment for Simultaneous Transmission of Speech and Telegraph Signals," ElektrotehniskiVestnik, vol. 40, No. 8–10, Aug.–Oct. 1973, pp. 234–239.

S. Motoyama, et al., "A Subscriber Loop Multiplexing System for Integrated Service Digital Networks," Conference: NTC '81, IEEE 1981 National Telecommunications Conference, Innovative Telecommunications—Key to the Future, Nov. 29–Dec. 3, 1981, New Orleans, Louisiana, pp. D5.1.1–D.5.1.5.

G. Neumann, Flexible and Cost–Minimising System Concept (Ericsson Digital PABX MD 110), NET Nechrichten Elektronik & Telematik, Special Issue, Mar. 1988, pp. 11, 12, 14, 15.

H. Nishi, et al., "Control of a Star/Bus Key Telephone System," NTT R & D, vol. 39, No. 8, 1990, pp. 1221, 1222, 1224–1228.

A. Pietrasik, et al., "Subscriber Carrier Telephony System 1+1," Wiadomosci Telekomunikacyjne, vol. 17, No. 7–8, Jul.–Aug. 1977, pp. 193–198.

V. Punj, "Broadband Applications and Services of Public Switched Networks," IEEE Transactions on Consumer Electronics, vol. 35, No. 2, May 1989, pp. 106–112.

T. Sodeyama, et al., "Intelligent House," Journal of the Institute of Electronics, Information and Communication Engineers, vol. 72, No. 9, Sep. 1989, pp. 1024–1026.

H. Tanaka, et al., "Telecontrol System VJ–501," National Technical Report, vol. 32, No. 6, Dec. 1986, pp. 809–817.

C. Valenti, "Study of the Feasibility and Advisability of Digital Subscriber Lines Operating at Rates Substantially in Excess of the Basic Access Rate," T1E1.r Technical Subcommittee (T1E1.4/91–115), pp. 1–4, Aug. 26, 1991.

D. L. Waring, "The Asymmetrical Digital Subscriber Line (ADSL): A New Transport Technology for Delivering Wideband Capabilities to the Residence," Globecom '91, IEEE, pp. 1979–1986.

K. Yamamoto, et al., "New Home Telephne System Using Japanese Home Bus System Standard," IEEE Transactions on Consumer Electronics, vol. 35, No. 3, Aug. 1989, pp. 687–697.

T. Yamazaki, et al., "Home Appliance Technologies," NEC Research and Development, No. 96, Mar. 1990, pp. 292–299.

_, "CEBus: US Households are Being Networked," Funkschau, No. 9, Apr. 1989, pp. 45–47.

_, "Shared Services (Data/Voice Network)," Communications News, vol. 25, No. 11,Nov. 1988, pp. 46–47.

Weinstein et al., "Data Transmission by Frequency–Division Multiplexing Using the Discrete Fourier Transform," IEEE Transactions on Communication Technology, vol. V7 Com–19, No. 5Oct. 1971 (pp. 628–634).

Zimmerman et al., "The AN/GSC –10 (KATHRYN) Variable Rate Data Modem for HF Radio," IEEE Transactions on Communication Technology, vol. Com–15, No. 2, Apr. 1967 (pp. 197–204).

Chang, "Synthesis of Band–Limited Orthogonal Signals for Multichannel Data Transmission," Manuscript, Aug. 1966 (pp. 1775–1796).

Schmid et al., "Frequency–domain Partial Response Signals for Parallel Data Transmission," IEEE Transactions on Communication Technology, vol. Com–17, No. 5, Oct. 1969 (pp. 536–543).

Saltzberg, "Performance of an Efficient Parallel Data Transmission System," IEEE Transactions on Communication Technology, vol. Com–15, No. 6, Dec. 1967 (pp. 805–811).

Hirosaki et al, "Advanced Groupband Data Modem Using Orthogonally Multiplexed QAM Technique," IEEE Transactions on Communication Technology, vol. Com–34, No. 6, Jun. 1986 (pp. 587–592).

Hirosaki, "An Orthogonally Multiplexed QAM System Using the Discrete Fourier Transform," IEEE Transactions on Communication Technology, vol. Com–29, No. 7, Jul. 1981 (pp. 982–989).

Franco et al, "An Orthogonal Coding Technique For Communication," General Dynamic/Electronic Research Division (pp. 126–133).

Cimini, Jr., "Analysis and Simulation of a Digital Mobile Channel Using Orthogonal Frequency Division Multiplexing," IEEE Transactions on Communication Technology, vol. Com–33, No. 7, Jul. 1985 (pp. 665–675).

Freeman, "Telecommunication Transmission Handbook," 2,,d Ed., Cover, pp. xi–xxvii, Chapter 3 (pp. 79–127), Chapter 5 (pp. 172–252), Chapter 6 (pp. 253–288), 1981.

Hoffman, "Cable, Television, and the Consumer Electronic Bus," the Int'l TV symposium–Montreux, Switzerland, pp. 165–173, 1987.

Nichols, "Build a Pair of Line–Carrier Modems," pp. 87–91, 1988**.

Olshanksky, "A full service network for the copper plant," Telephony, pp. 52–60, 1985**.

Sheets and Graf, "Build This Carrier Current Audio Transmitter," Radio Electronics, pp. 55–64, 1989**.

Sheets and Graf, "Build This Carrier Current Receiver," Radio Electronics, pp. 55–94, 1989**.

"TeleConcepts . . . Introduces the 'Just Plug It In' Intercom System," TeleConcepts Brochure, Newington, CT, 2 pp, undated.

"Remote Extender Owner's Manual", Windmaster Manufacturing brochure, DeFuniak Springs, FL, 7 pp., undated.

"Model 4000 Series," Lightwave Systems, Inc., brochure, 6 pp., undated.

IBM races to the desktop, 1 pg., undated.

"Video Transmission System—Send video over ordinary wire—no coax required," Javelin brochure, 2 pp., undated.

TeleVideo brochure, 2 pp., undated.

Advertisement for a MasterMind universal remote control device, 1989.

Instant Network Rides on Phone Lines,: Electronic Design, 1987.

Design and Engineering Exhibition listing.

Johnson, "Videohub Cuts Costs, Opens Options", Data communications, pp. 109, 110, 1992.

Propp et al., "The AC Powerline As A Communications Medium for DAC Applications," IDAC, pp. 17–25, 1990.

Schwartz, "Commtek Intro Video Over UTP," Communications Week, p. 5, 1992.

"Commtek Corporation Announces First Commercially Available Transmission of Real Time Video and Voice on Unshielded Twisted pair Telephone Lines," News Release, Commtek Corp., 4 pp, 1992.

U.S. Appl. No. 10/401,785, filed Mar. 31, 2003, Goodman, David D., Inline Connection Corp.

U.S. Appl. No. 11/071,362, filed Mar. 4, 2005, Goodman, David D., Inline Connection Corp.

U.S. Appl. No. 09/863,061, filed May 22, 2001, Goodman, David D., Inline Connection Corp.

U.S. Appl. No. 10/970,734, filed Oct. 22, 2004, Goodman, David D., Inline Connection Corp.

U.S. Appl. No. 10/970,659, filed Oct. 22, 2004, Goodman, David D., Inline Connection Corp.

U.S. Appl. No. 10/970,721, filed Oct. 22, 2004, Goodman, David D., Inline Connection Corp.

Chow et al., "A Multi–Drop In–House ADSL Distribution Network", IEEE, 1994.

* cited by examiner

HIGH-SPEED DATA COMMUNICATION OVER A RESIDENTIAL TELEPHONE WIRING NETWORK

RELATED APPLICATIONS

This application is a continuation of U.S. patent application Ser. No. 09/591,199, filed Jun. 9, 2000, now U.S. Pat. No. 6,532,279 which in turn claims priority under 35 USC §119(e)(1) from U.S. Provisional Application No. 60/138,754, filed Jun. 11, 1999, both of which are incorporated herein by reference.

BACKGROUND

This invention relates to communication between devices over an active telephone wiring network in a residence.

Active telephone wiring networks have been used for data communication in frequency bands outside the telephone voice band. For example, Digital Subscriber Loop (DSL) signaling is used for data communication over the local telephone loop that joins a telephone exchange or switching office and a customer premises, such as a residence.

Within a residence or a multiple-residence dwelling, active telephone wiring has been used to pass data signals, for instant, according to a 10 Mb/s Ethernet standard. International Patent Application No. US98/11197, "Twisted Pair Communication System," filed on Jun. 1, 1998, describes several alternative approaches to such data communication over active telephone wiring.

SUMMARY

In a general aspect; the invention provides a way of communicating at a high-speed over an active telephone wiring network in a residence, as well as communicating between the residence and a telephone exchange over the telephone wiring network. For example, communication between computers within the residence can be at 100 Mb/s, while data communication between the computers and the telephone exchange can be according to a DSL standard.

In a first aspect, in general, the invention is a method for data communication over an active telephone wiring network. The method includes passing voice signals in a voice band of frequencies between a telephone exchange and one or more telephones over the telephone wiring network, and passing data signals in a first data band of frequencies between the telephone exchange and a first location on the telephone wiring network. The method also includes bridging the data signals in the first data band and signals in the second data band over the telephone wiring network between the first location and a second location on the telephone wiring network. The method also includes passing the data signals in the second data band between a computer and the telephone wiring network at the second location.

The method can include one or more of the following features.

The method further includes blocking signals in the second data band from passing over the wiring network to the telephone exchange.

The method further includes blocking signals in the first data band from passing over portions of the telephone wiring network, including blocking signals in the first data band from passing over the telephone wiring network to the second location on the wiring network.

The first data band is substantially within a frequency band from 5 kHz to 1 MHz.

Passing data signals in the first data band between the telephone exchange and the first location on the telephone wiring network includes passing signals according to a digital subscriber loop (DSL) format between the telephone exchange and the first location.

The second data band is substantially at frequencies above the first data band.

Passing the data signals in the second data band between the first location and the second location on the wiring network includes passing the data signals in an Ethernet format.

Passing the data signals in the second data band includes passing the data signals at approximately a 10 Mb/s data rate.

Passing the data signals in the second data band includes passing the data signals at approximately a 100 Mb/s data rate.

In another aspect, in general, the invention is a system for data communication over an active telephone wiring network, which includes a first segment coupling a telephone exchange and a residence and a second portion forming a network within the residence, and over which voice signals pass in a voice band of frequencies between the telephone exchange and one or more telephones coupled to the second portion of the wiring network. The system includes a first communication module and a second communication module. The first communication module is at a first location on the telephone wiring network and includes a first port for coupling to the telephone wiring network and providing a communication path in a first data band of frequencies above the voice band between the communication module and the telephone exchange over the telephone wiring network. The first communication module also includes a second port for passing data signals in the first data band between the first communication module and a modem, and circuitry for passing signals in the first data band between the first port and the second port. The first communication module also includes a number of ports for coupling to a data hub and passing data signals in a second data band of frequencies above the first data band between the first communication module and the data hub, and circuitry for passing signals in the second data band between the telephone wiring network and one of the ports for coupling to the data hub. The second communication module is at a second location on the telephone wiring network and includes a first port for coupling to the telephone wiring network and providing a communication path in the second data band between the first communication module and the second communication module over the telephone wiring network. The second communication module also includes a second port for passing signals in the second data band from the second communication module to a computer at the second location, and circuitry for passing signals in the second data band between the first port and the second port.

The system can include one or more of the following features.

The system further includes a first hub coupled to the first communication module, and a modem coupled between the first hub and the second port of the first communication module. The modem bridges data communication in the first data band and data communication in the second data band. The system provides a data communication channel passing between the computer at the second location and the telephone exchange. This data communication channel passes over the telephone wiring network in the second data band between the second communication module and the first communication module, passes between the first communication module and the modem through the first hub, and passes between the modem and the telephone exchange over the wiring network in the first data band.

The system includes a second hub coupled between the second communication module and the computer at the second location. The second communication module includes a third port for coupling to the second hub, a fourth port for coupling to a branch of the wiring network, circuitry for passing signals in the second data band between the third port and the fourth port, and circuitry for passing signals in the voice band between the first port and the fourth port.

The system includes a filter module on the wiring network at a location between the telephone exchange and the first and the second locations at with the communication modules are located. The filter modules includes a filter for blocking signals in the second data band from passing from the communication modules to the telephone exchange.

The filter module includes a filter for blocking signals in the first data band from passing from the telephone exchange to a portion of the wiring network.

The filter module further includes a circuitry for passing signals in the second data band between branches of the wiring network that extend from the filter module.

The invention has an advantage that it enables high speed communication among computers within a residence making use of active telephone wires, while concurrently enabling data communication between those computers and a telephone exchange, which to may provide a communication path to other computers, for example, over the Internet.

The invention also has the advantage that additional signals, such as video signals, can be passed within the residence concurrently with data communication making use of common circuitry for both data and video communication.

Other features and advantages of the invention are apparent from the following description, and from the claims.

DESCRIPTION

Figure 1:
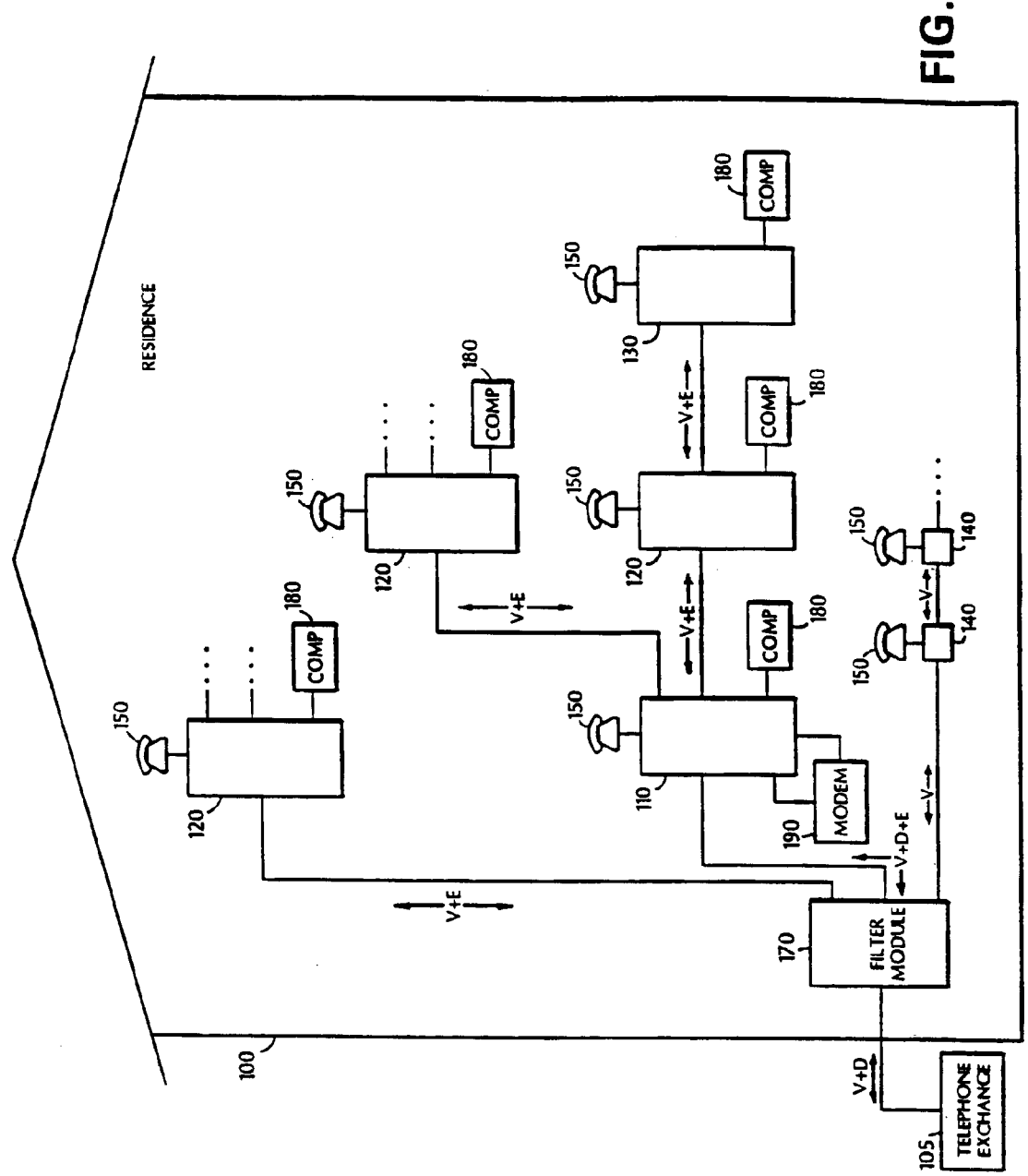
FIG. 1 is a diagram of a telephone wiring network in which voice and data signals are passed with a residence, and between the residence and a telephone exchange.

Referring to FIG. 1, a data communication system configured according to this invention allows data communication between a number of computers 180 in a residence 100, such as a single-family house, over an active telephone wiring network within the residence. The system also supports data communication between computers 180 and computers outside residence 100 over the telephone wiring network that couples the residence and a telephone exchange 105 or switching office, referred to as a "local loop." Telephone exchange 105 provides data paths to those other computer, for example, over the Internet. Telephone exchange 105 drives telephone communication within a telephone voice band of frequencies (210, FIG. 2), which extends to approximately to 4 kHz, to a number of telephones 150 within residence 100 over the telephone wiring network. Telephones 150 can include any of a variety of devices that communicate within the voice band, including fax machines and telephone band modems.

The communication system includes circuitry at a location at which the local loop is coupled to the wiring network within the residence, and at locations at which the wiring network branches within the residence or at which telephones and computers are coupled to the network. One function of this circuitry is to filter signals on the wiring network such that signals in certain frequency bands are limited to particular portions of the wiring network.

Figure 2:
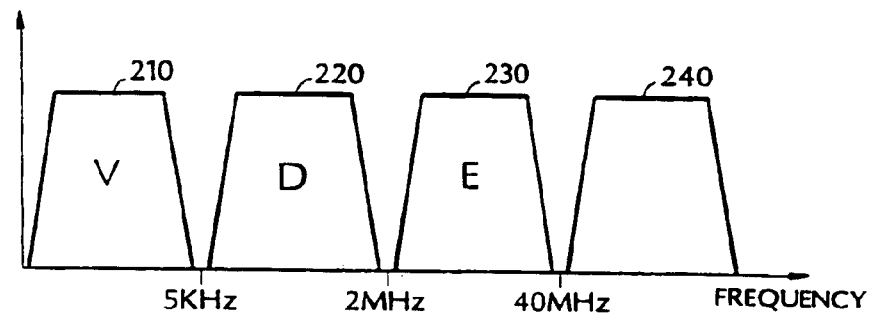
FIG. 2 is a diagram that illustrates voice and data bands used to pass signals over the telephone wiring network.

Referring to FIG. 2, in this embodiment, three ranges of frequencies are used for voice and data communication over the wiring network. Voice band 210 extends from 0 Hz to approximately 4 kHz. Voice band 210 include a power component at frequencies below the audio range (e.g., at 0 Hz), which can be used to power devices such as telephones on the network, and voice signal component that is predominantly within the range of 300 Hz to 3.3 kHz. A first data band 220 is at frequencies above voice band 210 such that communication within the first data band does not conflict with communication within the voice band. In this embodiment, first data band 220 extends approximately from 10 kHz to 1 MHz, and signaling within this band uses a Digital Subscriber Loop (DSL) standard, such as Asymmetric DSL (ADSL). The first data band is referred to below as the "DSL band," although in various alternative embodiments, signaling in first data band 220 is not necessarily according to a DSL standard. This first data band is used for data communication between telephone exchange 105 and residence 100. A second data band 230 is at frequencies above the first data band such that communication within the second data band does not conflict with communication in either voice band 210 or in first data band 220. In this embodiment, second data band 220 is between 3 Mhz and 40 MHz. In alternative embodiments, second data band 220 extends between different frequency limits that are above first data band 220. This second data band is used for data communication between computers 180 over the telephone wiring network within residence 100, and as discussed below, between computers 180 and a modem 190 that bridges communication in the first and the second data bands. In a first embodiment, signaling within second data band 230 uses an Ethernet standard, 10-BaseT, which provides 10 Mb/s data rates between the computers and predominantly uses a range of frequencies from 3 MHz to 15

MHz. Alternatively, 100-BaseT Ethernet signaling is used to provide 100 Mb/s data rates between the computers. The second data band is referred to below as the "Ethernet band," although in various alternative embodiments, signaling within this band is not necessarily according to an Ethernet standard. In the figures, signals in the voice band, first data band, and second data band are illustrated using the labels "V" (voice), "D" (DSL), and "E" (Ethernet), respectively. In an alternative embodiments described below, an additional high-frequency band 240 extends above the second data band and is used, for example, to distribute video signals within the residence.

Referring back to FIG. 1 voice and DSL signals pass in DSL band 220 over the local loop that couples telephone exchange 105 and residence 100. The local loop is generally made up of a single twisted pair of wires, which provides one bi-directional voice channel associated with a first telephone number as well as bi-directional DSL data communication to the residence (illustrated as "V+D" in the figure). Alternatively, a second twisted pair on the local loop provides a second bi-directional voice channel for a second telephone number, although the DSL signaling still uses only a single pair in that case. Within the residence, the voice band is passed over the entire wiring network to allow communication between telephones 150 and telephone exchange 105. Within the residence, the wiring network is made up of two twisted pairs of wires (four conductors). The voice band and DSL band signals pass over one of the twisted pairs, and in the alternative that a second voice channel passes to the residence, the second voice channel passes over the other of the twisted pairs within the residence. Ethernet signals pass over the two twisted pairs, each pair passing communication in one direction along the wiring network. In some alternative embodiments in which a different mode of signaling than 10-BaseT or 100-BaseT is used within the second data band only a single twisted pair wiring network is used for bi-directional signaling in the second data band within the residence.

Modem 190, which in this embodiment is a DSL modem, is coupled to circuitry 110 at a location on the wiring network and converts between DSL signaling and Ethernet signaling. For instance, this location is within the living area of a residence near a location where a computer 180 is used. DSL signals pass between the local loop and modem 190 over a segment of the telephone wiring network with the residence. Modem 190 converts data signals between the DSL band and the Ethernet band. The Ethernet signals are passed in Ethernet band 230 over portions of the telephone wiring network within the residence, thereby providing data communication between computers 180 at the residence, and providing communication between computers 180 and computers at other residences or locations over a data path that is in Ethernet band 230 within the residence between computers 180 and modem 190, and in DSL band 220 between modem 190 and telephone exchange 105.

FIG. 1 illustrates an example of a branching wiring network with a number of telephones 150 and computers 180 coupled to the network. FIG. 1 is intended to be an illustrative. Communication systems according to this invention can be arranged with different specific wirings network that include fewer, or more, telephones and computers, and that have fewer, or more, branches.

As illustrated in FIG. 1, voice and DSL band signals pass to the residence through a filter module 170. A first branch of the wiring network passes from filter module 170 to circuitry 110 at the location at which modem 190 is connected to the network. As illustrated in FIG. 1, the wiring network within the residence extends in a branching network beyond circuitry 110, and includes additional branches extending from filter module 170.

Figure 3:
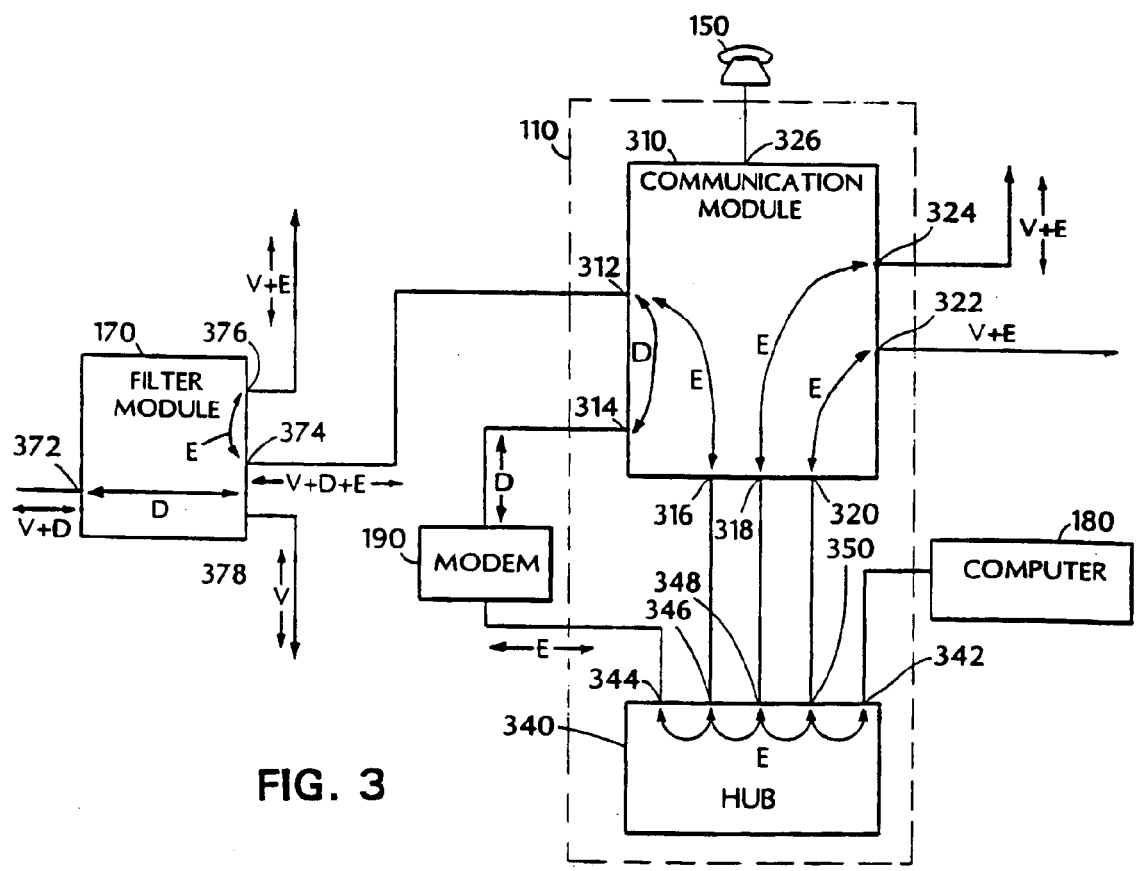
FIG. 3 is a diagram that illustrates data paths in the DSL and Ethernet bands.

Referring to FIG. 3, circuitry 110 includes a communication module 310 and a hub 340. In this embodiment, communication module is designed to fit into an industry-standard wall receptacle used for telephone wiring, and to be covered with a wall plate that includes ports into which cables coupling communication module 310 to telephone 150, modem 190, and hub 340 are inserted. Circuitry 110 also includes wiring blocks or "punch-down" terminals which are used to connect the circuitry to the branches of the telephone wiring network that come together at the location of the circuitry. Circuitry 110 and filter module 170 include various filters that direct signals in different frequency bands between their terminals. In alternative embodiments, communication module has different physical structure, for example, for surface mounting rather than mounting inside a wall receptacle, and ports of the communication module can be combined a fewer number of jacks or connectors. In other alternative embodiments, an Internet Protocol (IP) router may be used instead of a hub, thereby establishing a separate IP sub-network within the residence.

Filter module 170 includes a terminal 372, such as a "push-down" terminal, coupled to the local loop over which signals in the voice and DSL bands pass. These signals pass through filter module 170 to a terminal 374 that connects to a portion of the wiring network that passes to terminal 312 at communication module 310.

Communication module 310 couples signals in the DSL band 220 between terminal 312 and a port 314, which provides a DSL band signal path between filter module 170 and modem 190.

Modem 190 converts between DSL band and Ethernet band signaling and couples signals in Ethernet band 230 to a port 344 on hub 340. Hub 340 passes data signals in the Ethernet band between its ports 342, 344, 346, 348 and 350. In this embodiment, hub 340 is a standard Ethernet hub that provides communication between 10-BaseT ports. Ports 346, 348 and 350 are coupled to ports 316, 318, and 320, respectively, of communication module 310 to pass signals in the Ethernet band between the communication module and the hub. A computer 180 is coupled to port 342 on the hub.

Computer 180 communicates with computers outside the residence through a data path in the Ethernet band that passes through hub 310 to modem 190, and then in the DSL band from modem 190 through communication module 310 and filter module 170 to telephone exchange 105 (FIG. 1).

Internally, communication module 310 passes signals in the Ethernet band between port 320 and terminal 322, thereby passing Ethernet signals from hub 340 over the telephone wiring network beyond communication module 310 away from the local loop. Communication module 310 also passes signals in the Ethernet band between port 318 and terminal 324, thereby passing Ethernet signals to another branch of the wiring network. Communication module 310 also passes signals in the Ethernet band between port 316 and terminal 312, thereby passing signals between hub 340 and filter module 170.

Filter module 170 couples signals in the Ethernet band between its terminal 374, provides a connection to communication module 310, and a terminal 376, which provides a connection to an additional branch of the wiring network within the residence. Ethernet band signals pass from hub 340 through communication module 310 to filter module 170 and on to that additional branch, thereby enabling data communication between computer 180 on that additional branch and modem 190, which is connected to hub 340.

Communication module 310 blocks Ethernet band signals from passing between its ports and terminals other than as described above. Filter module 170 blocks Ethernet signals from passing out its terminal 372 toward the telephone exchange. Filter module 170 also blocks Ethernet band signals from passing to an additional terminal 378, which is connected to a branch of the wiring network within the residence that provides only communication within the voice band and does not support communication among computers on that branch.

In this embodiment, filter module 170 blocks DSL band signals from passing onto branches of the telephone wiring network other than the branch leading to modem 190. In this way, DSL band signals are attenuated less than they would be if they were allowed to flow on all branches of the wiring network, and other degradations, such as those due to reflections from the other branches are mitigated. Similarly, communication module 310 does not couple signals in the DSL band further onto the wiring network, also mitigating the effect of attenuation and echoes in that band. In alternative embodiments, this blocking of signals in the DSL band is not necessarily required, depending on the type of signaling used and its robustness to degradations resulting from the branching of the wiring network.

In an alternative arrangement of communication module 310, various signal paths may be omitted. For instance, the Ethernet band signal path from port 316 to terminal 312 and port 316 are not needed if there is no additional branch of the wiring network coupled to filter module 170 over with Ethernet band communication is required. In that case, the Ethernet band coupling of terminals 374 and 376 at filter module 170 would also not be required. Also, if the wiring network does not branch at communication module 310, then terminal 324 and port 318 and the Ethernet band path coupling them is not needed.

Figure 4:
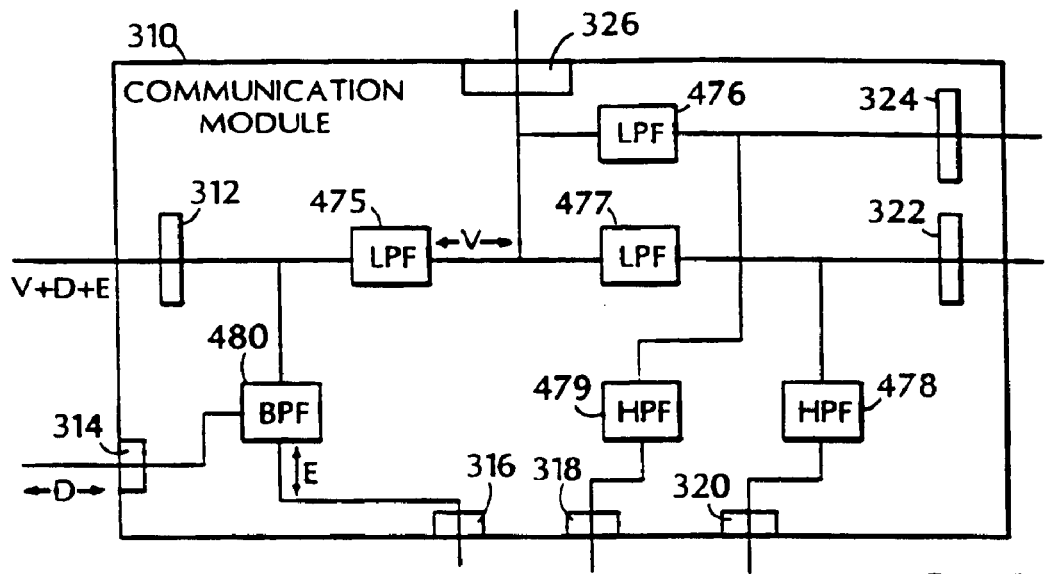
FIG. 4 is a block diagram of a communication module at the location of a modem.

Referring to FIG. 4, communication module 310 includes an interconnection of filters that couple signals in various frequency bands within the module. In this embodiment, these filters are passive filters. In alternative embodiments, these filters can be active, for example, drawing power from the telephone wiring network. Low-pass filters 475, 476, and 477 pass signals in the voice band and block signals and provide high impedance to the other bands. In this embodiment, these filters have a cut-of frequency of 5 kHz. One terminal of each of low-pass filters 475, 476, and 477 are connected to terminals 312, 324, and 322, respectively. These connections consist for four conductors each. The low-pass filters implement two parallel low-pass filters, one for each pair of conductors, and do not bridge signals between the pairs. One embodiment of these filters is simply a 100 uH inductor connected in series on each of the four conductors. The other terminals of the low-pass filters are coupled to one another, and to port 326 which provides a signal path to telephone 150 that is coupled to the communication module. In this embodiment, port 326 is a standard RJ-11 jack to which a telephone can be plugged.

High-pass filters 478 and 479 pass signals in the Ethernet band and block signals and provide high impedance to the other bands. In this embodiment, these filters have a cutoff frequency of 2 MHz. These high-pass filters implement two parallel high-pass filters, one associated with each pair of the wiring network. High-pass filter 478 is connected between port 320 and terminal 324 providing a Ethernet band path and high-pass filter 479 is connected between port 318 and terminal 322.

A band-pass filter 480 is coupled between terminal 312 and ports 314 and 316. Band-pass filter passes signals in the Ethernet band between terminal 312 and port 316 and passes signals in the DSL band between terminal 312 and port 314. In this embodiment, band-pass filter passes signals above 2 MHz between terminal 312 and port 316, implementing two parallel paths each associated with one pair of the wiring network, and passes signals below 2 MHz between terminal 312 and port 314. Note that since only one pair is used for the DSL band communication, only signals on one of the pairs need to be passed to port 314. Optionally, band-pass filter 480 blocks signals in the voice band from passing to port 314.

Figure 5:
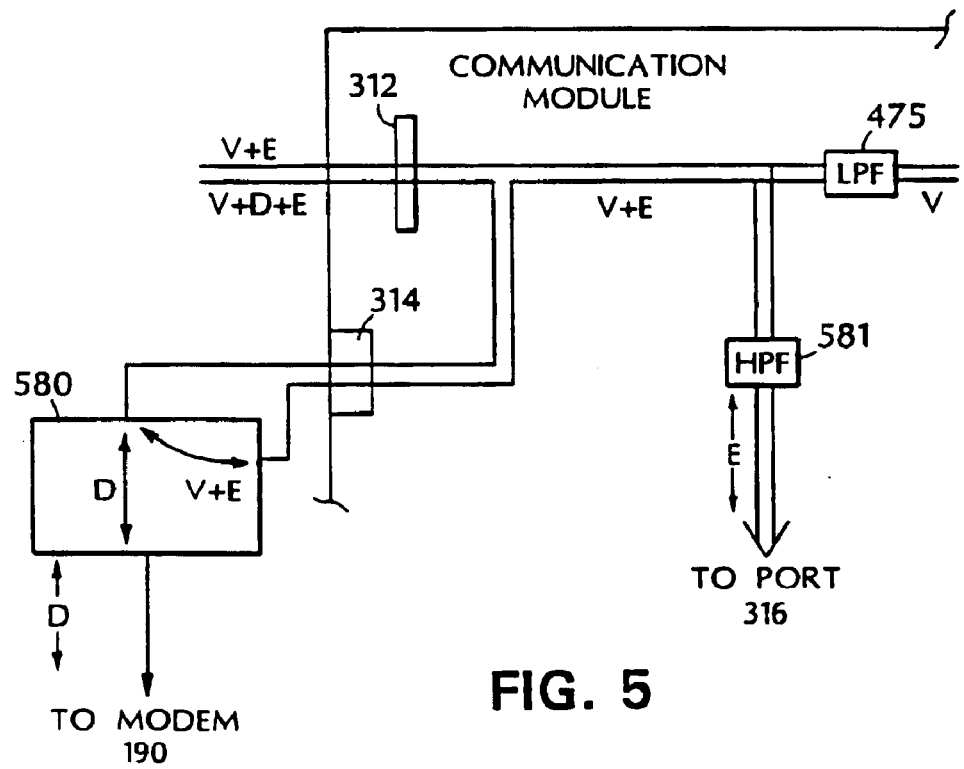
FIG. 5 is a block diagram of an alternative communication module.

Referring to FIG. 5, in an alternative arrangement of communication module 310, an external band-pass filter 580 is used instead of band-pass filter 480. In FIG. 5, each pair of the wiring network is illustrated using separate lines (note that in the previous figures, each line represents, in general, two pairs made up of four conductors). One pair connected to terminal 312 carries voice and Ethernet band signals. That pair is connected directly to low-pass filter 475. The other pair, which also carries DSL band signals, is connected to port 314. External band-pass filter 580 couples signals in the DSL band on that pair to modem 190, and couples signals in the voice band and the Ethernet band, that is, signals outside the DSL band, back to port 314. That pair of conductors of port 314 are connected to the other inputs of low-pass filter 475. High-pass filter 581, of the same design as high-pass filters 478 and 479 couples port 316 and low-pass filter 475. Therefore Ethernet band signals pass between port 316 and terminal 312 via external band-pass filter 580, and as do voice-band signals passing between low-pass filter 475 and terminal 312.

Figure 6:
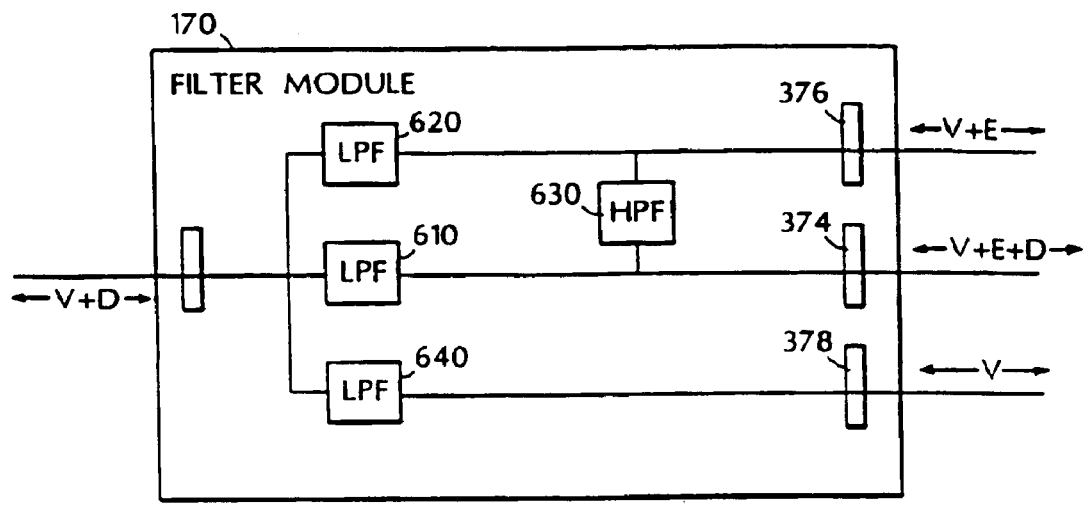
FIG. 6 is a block diagram of a filter between the local loop and the wiring network in the residence.

Referring to FIG. 6, filter module 170 includes an interconnection of filters that couple signals in various frequency bands within the module. As in FIG. 5, each pair of conductors is illustrated with a separate line in FIG. 6. A low-pass filter 610 is connected between terminals 372 and 374. This filter blocks signals in the Ethernet band from passing from the wiring network within the residence to the local loop and thereby to telephone exchange 105. In order to pass signals in the voice and DSL bands, low-pass filter 610 has a cut-off frequency of 2 MHz for the wire pair that carries both voice and DSL band signals. The cut-off frequency for the other pair is 5 kHz, since that pair only carries voice band signals to the telephone exchange. A low-pass filter 620 connected between terminal 372 and terminal 375, with a cutoff frequency of 5 kHz, blocks the DSL signal from passing from to terminal 376 from the telephone exchange, and blocks Ethernet band signals from passing from the wiring network in the residence from passing to the telephone exchange. A low-pass filter 640 connected between terminal 372 and terminal 378 blocks DSL band signals from passing from the telephone exchange to the branch of the wiring network which is used only for signals in the voice band. By presenting high impedances in the DSL band to terminal 372, the DSL signal is not attenuated or affected by echoes from the branches of the wiring network in the residence that do not lead to modem 190. A high-pass filter 630 is also connected between terminals 374 and 376. This high-pass filter provides a path for signals in the Ethernet band to pass between branches of the wiring network within the residence.

Figure 7:
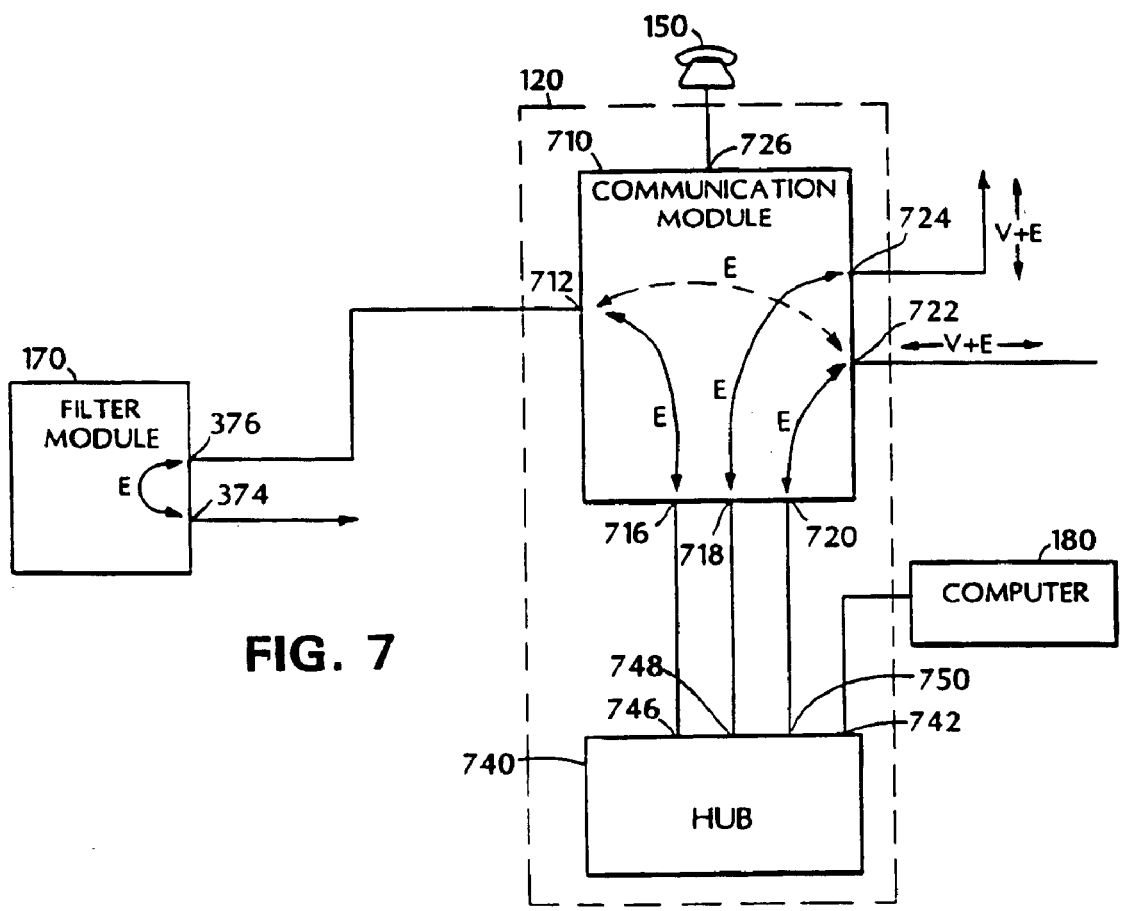
FIG. 7 is a diagram that illustrates data paths in the Ethernet at a communication module.

Referring to FIG. 7, circuitry 120 is coupled to a branch of the wiring network in the residence that carries signals in the voice and DSL bands (see FIG. 1). Note that in FIG. 7 each line represents two pairs of conductors. Circuitry 120 is similar to circuitry 110 described above, but does not include signal paths for the DSL band. Circuitry 120 includes a communication module 710 and a hub 740. As with communication module 310, communication module 710 is designed to fit into an industry-standard wall receptacle used for telephone wiring, and to be covered with a wall plate that includes ports into which cables coupling communication module 710 to telephone 150, and hub 740 are inserted.

A terminal 712 on communication module 710 is connected over the wiring network to terminal 376 of filter module 170. Voice band and Ethernet band signals pass between filter module 170 and communication module 710 through terminal 712. Three ports on communication module 710, 716, 718, and 720 are connected to corresponding ports 746, 748, and 750 on hub 740. Hub 740 provides a path for signals in the Ethernet band between these ports. In communication module 710, port 716 is coupled in the Ethernet band to port 712, port 718 to port 724, and port 720 to port 722. Ports 712, 722, 724 and 726, to which telephone 150 is attached, are coupled in the voice band. Hub 740 has an additional port 742 coupled to a computer 180.

Using this arrangement, computer 180 that is coupled to hub 740 communicate with a computer 180 coupled to hub 340 in the Ethernet band through a path that goes through hub 740, between port 716 and terminal 712 at communication module 710, to terminal 376 at filter module 170, from terminal 374 at filter module 170 to terminal 312 at communication module 310 (FIG. 3), through port 316 to hub 340, and finally to computer 180 which is coupled to hub 340.

Figure 8:
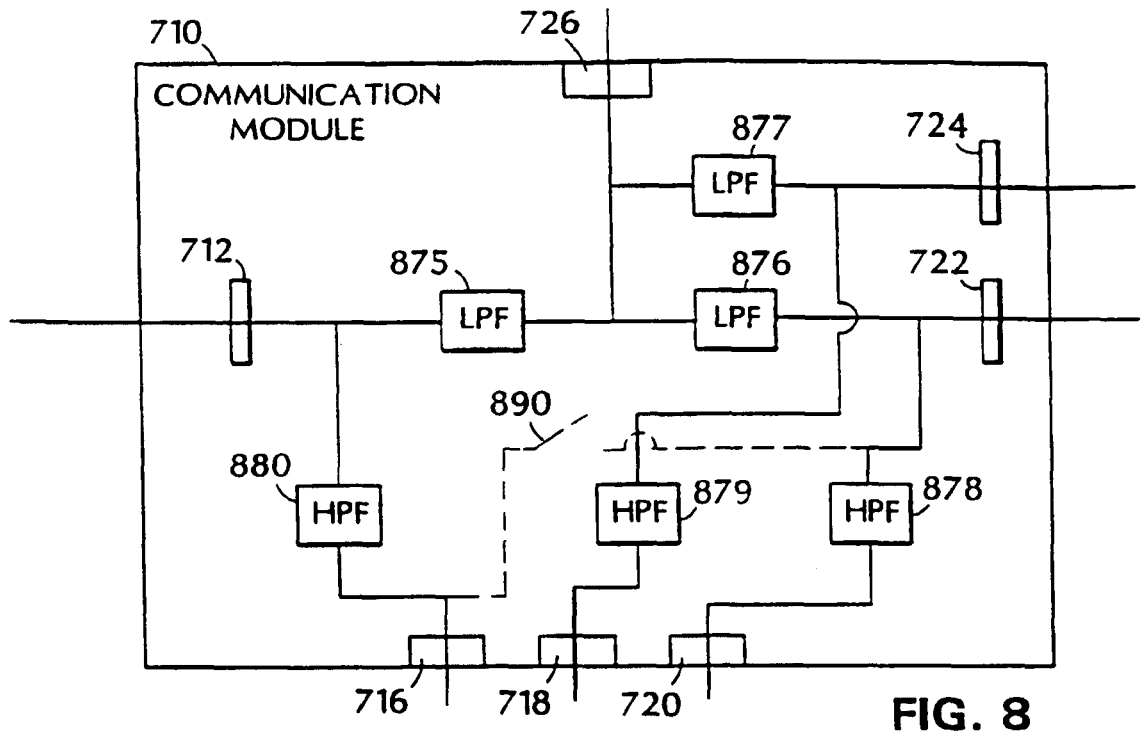
FIG. 8 is a block diagram of a communication module.

Referring to FIG. 8, communication module 710 is implemented using an interconnection of filters that couple signals in the voice and Ethernet bands between its ports and terminals. As with communication module 310, these filters are passive, although alternatively they can be implemented using active components drawing power from the telephone wiring network. Low-pass filters 875, 876 and 877 pass signals in the voice band, and block signals in the Ethernet band. In this embodiment these low-pass filters are implemented with cut-off frequencies of 2 MHz. Alternatively, a cutoff frequency at a frequency between 5 kHz and 2 MHz can be used, as there is no DSL band signal at on the wiring network at this communication module. The low-pass filters are connected to terminals 712, 722, and 724, respectively, and are all coupled to one another and to port 726, thereby coupling all the terminals and port 726 to telephone 150 in the voice band. Ports 716, 718, and 720 are coupled to high-pass filters 880, 879, and 878, respectively. These filters lock the voice band and pass the Ethernet band. In this embodiment their cut-off frequency is 2 MHz.

In arrangements in which the wiring network does not branch at communication module 710, terminal 724 and port 718 are not needed, nor are low-pass filter 877 or high-pass filter 879. Also, hub 740 can then have one fewer port. Also, if a computer is not coupled to the hub, the hub can have one fewer port. In arrangements in which the wiring network does not branch at communication module 710, the module has an internal switch 890 that couples the four conductors connected to ports 716 and 718. If no computer 180 is connected at the communication module, then hub 740 is not needed, and closing the switch passes Ethernet band signals from terminal 712 to terminal 722 through high-pass filter 880. In one alternative, ports 716 and 718 are combined into a single port, such as an RJ-45 jack, and switch 890 is automatically opened when a plug is inserted into the RJ-45 jack, thereby indicating that hub 740 will pass Ethernet band signals between ports 716 and 718.

Figure 9:
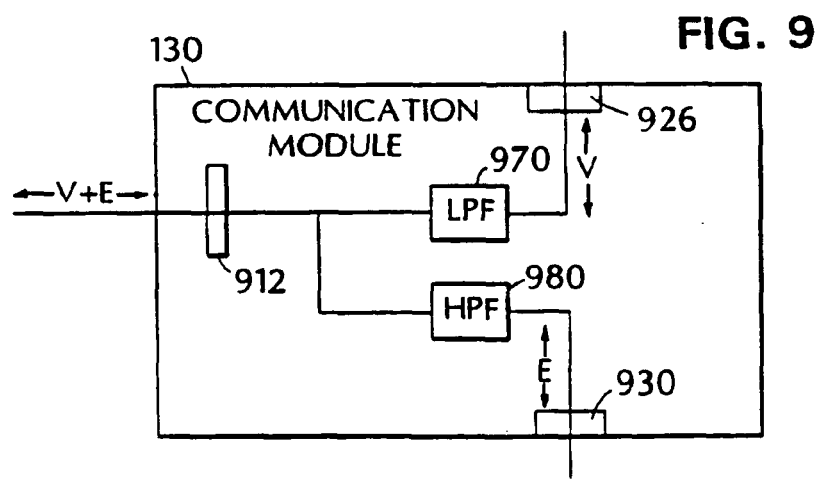
FIG. 9 is a block diagram of a communication module for use at an end of a branch of the wiring network.

Referring to FIG. 9, at an end of a branch of the wiring network circuitry 910 forms a simpler communication module than at intermediate points and branch points on the network. The two pairs of the wiring network are attached to terminal 912 providing a path toward filter module 170. A low-pass filter 970, which block Ethernet band signals and passes voice band signals is coupled between terminal 912 and port 926 to which a telephone can be attached. A high-pass filter 980, which passes Ethernet band signals and blocks voice band signals is coupled between terminal 912 and port 930, to which a computer 180 can be attached.

Referring back to FIG. 1, circuitry 120 and its variants that address the situations described above when there is no branching is used at the intermediate locations on the wiring network over which both voice and Ethernet band signals low. Circuitry 130, shown in FIG. 9 is used at the end points of these branches.

In this embodiment, 10-BaseT signals are passed predominantly within a 3 MHz to 15 MHz range of the Ethernet band. Hubs 340 at the location of modem 190 and hubs 740 at the other intermediate locations are standard 10-BaseT Ethernet hubs. Such standard hubs often perform analog to digital conversion on its input signals and digital to analog conversion on its outgoing signals. These conversions may introduce delay into transmission through the hub. A variety of alternative hubs are used in other embodiments. In some of these alternatives, analog signals are coupled between the ports reducing the delay as compared to some hubs that perform analog to digital and digital to analog conversion.

Figure 10:
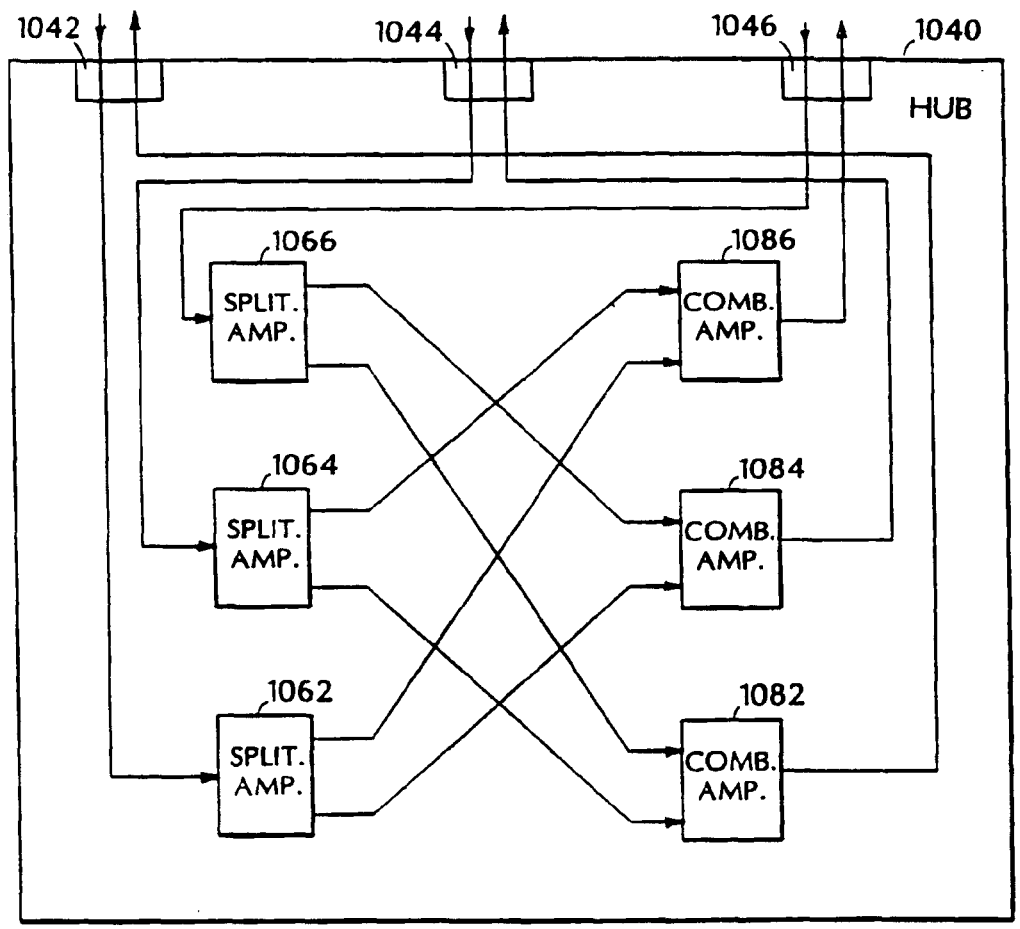
FIG. 10 is a block diagram of an analog hub.

Referring to FIG. 10, in a first alternative, a hub 1040 makes use of analog amplifiers to couple Ethernet band signals between the ports. In FIG. 10, each line represents a single pair of conductors, and each conductor passes Ethernet band signals in a single direction. Hub 1040 includes a number of ports 1042, 1044, 1046. Hubs with more ports follow a similar arrangement. The input signal from each port is passed to a corresponding splitting amplifier 1062, 1064, 1066, respectively. Each splitting amplifier passes the signal to a number of coupling amplifiers 1082, 1084, 1086. The splitting amplifier amplifies the signal sufficiently to sustain the energy levels of the signals after the split. The coupling amplifiers join the signals from the splitting amplifiers and direct the joined signals to the output pair of their corresponding ports.

In a related alternative embodiment, splitting amplifiers and coupling amplifiers are replaced with passive directional couplers. In such a passive arrangement, the Ethernet band signals are attenuated, which may limit the distance the signals can be passed within the wiring network, or the number of such passive hubs that can be traversed.

In another alternative, the hubs are standard 100-BaseT Ethernet hubs. In this alternative, modem 190 and all computers 180 are configured to communicate according to the 100-BaseT Ethernet standard. In yet another alternative, an arrangement of splitting and coupling amplifiers is used to pass the Ethernet signals between the ports of the hub.

In another alternative, the hubs are standard "10/100" Ethernet hubs which can accept both 10-BaseT and 100-BaseT communication, and perform signal conversion internally. Communication over the wiring network is according to the 100-BaseT standard in this alternative. Modem 190 and computers 180 can then use either Ethernet standard.

Figure 11:
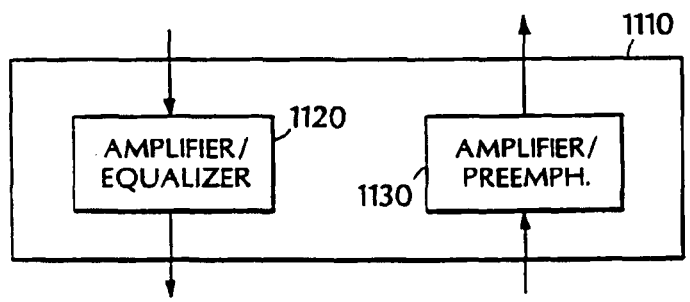
FIG. 11 is a block diagram of a signal converter for use with a hub.

In another embodiment in which 100 Mb/s signals are passed over the wiring network in the Ethernet band, the Ethernet band signals are amplified and spectrally tilted relative to standard 100-BaseT signaling, providing greater amplification to higher frequencies before they are applied to the wiring network, and are the Ethernet band signals are correspondingly attenuated as they are passed from the wiring network to a hub. Referring to FIG. 11, a signal converter 1110 is inserted in the connection between a 100-BaseT hub and a communication module, or equivalently, the signal converter in integrated into a hub for ports that communicate with the communication module. Signal converter 1110 includes an amplifier/equalizer 1120 for signals passing from the wiring network, and a pre-emphasis/amplifier 130 for signals passing to the wiring network.

In an alternative embodiment in which 100 Mb/s Ethernet band signals are passed over the wiring network and 100-BaseT hubs are used, in order to support 10-BaseT devices, a second type of signal converter is used between the hub and computers 180 and modem 190. If this convert detects that the device is a 10-BaseT device, it converts the signaling to 100-BaseT before passing the signal to the hub. In this way, an analog 100-BaseT hub can be used, while still supporting 10-BaseT devices. This alterative can optionally be combined with the signal converters that amplify 100-BaseT signals before applying them to the wiring network.

Figure 12:
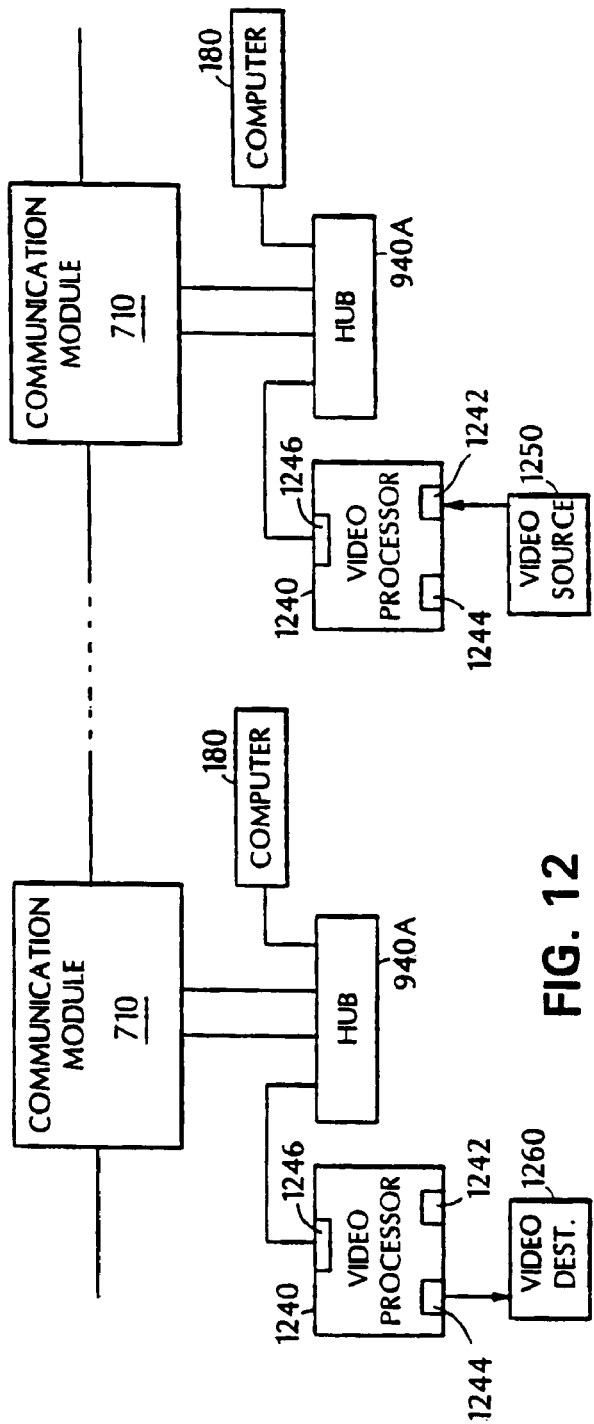
FIG. 12 is a block diagram which illustrates video signal communication over the wiring network.

In another alternative embodiment, the system makes use of the additional high frequency band 240 (see FIG. 2) for passing video signals within residence 100. Referring to FIG. 12, in this embodiment, the hubs are analog hubs 940A that couple both Ethernet band 230 and high-frequency band 240 between their ports. That is, both the Ethernet band and the high-frequency band are distributed together around the residence on the wiring network. A video source 1250 is at one location on the wiring network, while a video destination 1260 is at another location on the wiring network. Additional video destinations 1260 can optionally be at additional locations on the wiring network. Video source 1250 is coupled to a port of hub 940A through a video processor 1240, and video destination 1260 is coupled to its corresponding hub 940A through another video processor 1240.

Figure 13:
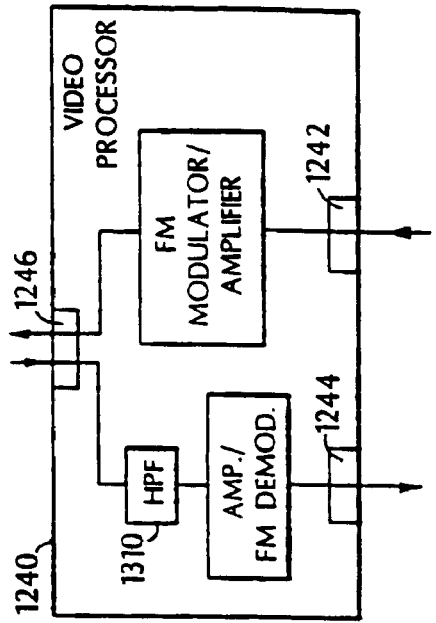
FIG. 13 is a block diagram of a video processor.

Referring to FIG. 13, a signal passing from video source 1250 passed through port 1242 on video processor 1240 and to an FM modulator/amplifier 1330. The input video signal is modulated to the additional frequency band that is above the Ethernet band, and amplified for transmission over the wiring network. In this embodiment, the signal is FM modulated at a carrier frequency sufficiently high so that the modulated signal has insignificant information below 40 MHz. The FM modulated signal is then passed through a port 1246 to hub 940A. At the receiving location, a signal passes from hub 940A passes to port 1246 on video processor 1240. This signal in general includes both Ethernet band signals and video signals in the additional frequency band. This input signal is passed to a high-pass filter 1310 that passes only signals above the Ethernet band. In this embodiment, the high-pass filter has a cutoff frequency of 40 MHz. The high-passed signal is then passed to an FM demodulator 1320 and then through an output port 1244 to video destination 1260.

In the embodiments described above, data signaling with the Ethernet band uses a separate pair of wires for communication in each direction. In an alternative embodiment, the telephone wiring network uses only a single pair of wires in a "half duplex" arrangement. For instance, a variant of 10-Base2 signaling in which collision detection uses signals (e.g., tones) within Ethernet band 230 can be used. In this case, the hubs make use of directional couplers to separate signals flowing in each direction. Similarly, a signaling standard known as HomePNA, which uses a frequency range outside the voice and DSL bands on a single telephone wiring pair, can be used in such embodiments.

Other arrangements of the circuitry at each location on the wiring network can alternatively be used. For example, the embodiments described above use hubs that are external to circuitry that is installed in a wall receptacle. In alternative embodiments, the hub is housed within the wall receptacle, and may optionally draw power from the telephone wiring network.

The embodiments described above refer to a wiring network within a residence. The same approach is applicable to a group of multiple residences, or a "campus" of a small number of buildings. Also, as shown in FIG. 1, only two branches that carry Ethernet band signals extend from filter module 170. Additional branches can be supported by essentially introducing a communication module and hub at the location of filter module 170.

In the embodiments described above, DSL signals pass between filter module 170 and location on a branch of the wiring network where modem 190 is located. In an alternative embodiment, DSL band signals are propagated further along the branch through the communication modules, thereby allowing modem 190 to be connected at another location along the branch.

It is to be understood that while the invention has been described in conjunction with the detailed description thereof, the foregoing description is intended to illustrate and not limit the scope of the invention.

What is claimed:

1. A communication hub for facilitating the communication of 100BaseT Ethernet signals and ordinary telephone signals across a junction where time conductive paths, each composed of two twisted wires, join together, the hub comprising:

three data-over-voice ports each of which connects to one of said conductive paths, three data ports, each of which connects to a port on a 100BaseT Ethernet hub via a path consisting of two twisted pair wires, three high pass filters that block ordinary telephone signals on each of two twisted pair paths but allow 100BaseT Ethernet signals to flow through freely, three low pass filters that block 100BaseT signals on each of two twisted pair paths but allow ordinary telephone signals to pass freely, one voice port for connection of one or two telephone devices, wherein,
   each high pass filter connects between a different one of said data-over-voice ports and a different one of said data ports, and
   each low pass filter connects between a different one of said data-over-voice ports and said voice port.

2. The system of claim 1 further including a bypass path connecting one of said data ports with one of said data-over-voice ports, and a switch connected in series with said bypass path, said switch breaking the connectivity of said path at one setting, and having substantially no effect on the system when at a second setting.

3. The system of claim 1 wherein said 100BaseT Ethernet hub includes circuitry for pre-emphasis and amplification of Ethernet signals after they undergo conventional 802.11 Ethernet processing but before they exit from one of the ports of said hub.

4. The system of claim 1 wherein said 100BaseT Ethernet hub includes circuitry for amplification and equalization of Ethernet signals before they undergo conventional 802.11 Ethernet processing.

5. A communication hub for facilitating the communication of 10BaseT Ethernet signals and ordinary telephone signals across a junction where time conductive paths, each composed of two twisted wires, join together, the hub comprising:

three data-over-voice ports each of which connects to one of said conductive paths, three data ports, each of which connects to a port on a 10BaseT Ethernet hub via a path consisting of two twisted pair wires, three high pass filters that block ordinary telephone signals on each of two twisted pair paths but allow 10BaseT Ethernet signals to flow through freely, three low pass filters that block 10BaseT signals on each of two twisted pair paths but allow ordinary telephone signals to pass freely, one voice port for connection of one or two telephone devices, wherein, each high pass filter connects between a different one of said data-over-voice ports and a different one of said data ports, and each low pass filter connects between a different one of said data-over-voice ports and said voice port.

6. The system of claim 5 further including a bypass path connecting one of said data ports with one of said data-over-voice ports, and a switch connected in series with said bypass path, said switch breaking the connectivity of said path at one setting, and having substantially no effect on the system when at a second setting.

7. The system of claim 5 wherein said 10BaseT Ethernet hub includes circuitry for pre-emphasis and amplification of Ethernet signals after they undergo conventional 802.11 Ethernet processing but before they exit from one of the ports of said hub.

8. The system of claim 5 wherein said 10BaseT Ethernet hub includes circuitry for amplification and equalization of Ethernet signals before they undergo conventional 802.11 Ethernet processing.

* * * * *